Dec. 12, 1939.  H. C. A. MEYER  2,183,368
FILTER
Filed Feb. 3, 1937   3 Sheets-Sheet 1

INVENTOR
Henry C. A. Meyer
BY
Blair, Curtis, Dunne + Hayward
ATTORNEYS

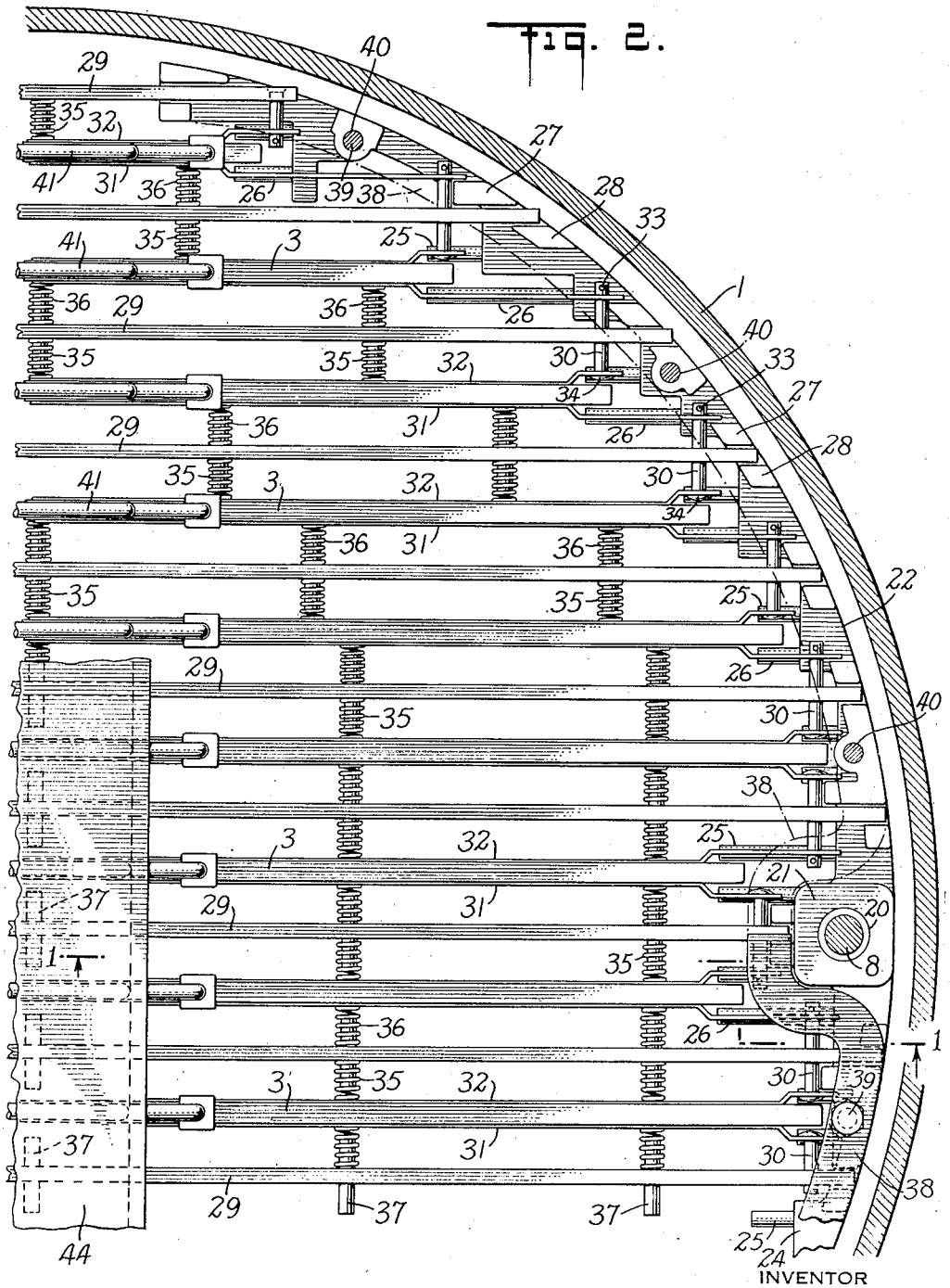

Dec. 12, 1939.   H. C. A. MEYER   2,183,368
FILTER
Filed Feb. 3, 1937   3 Sheets-Sheet 3
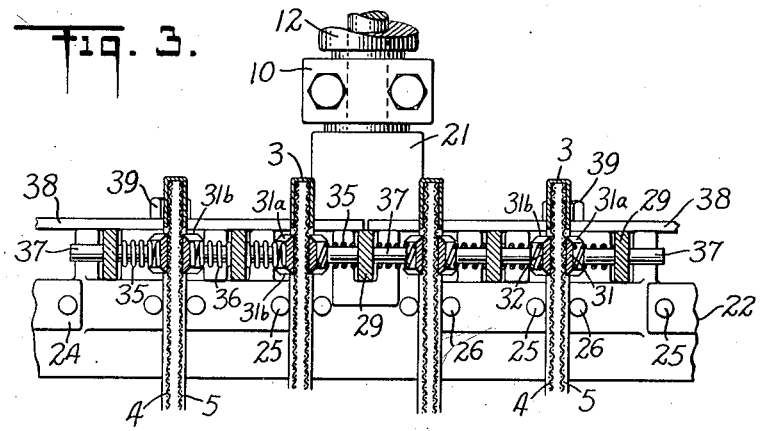
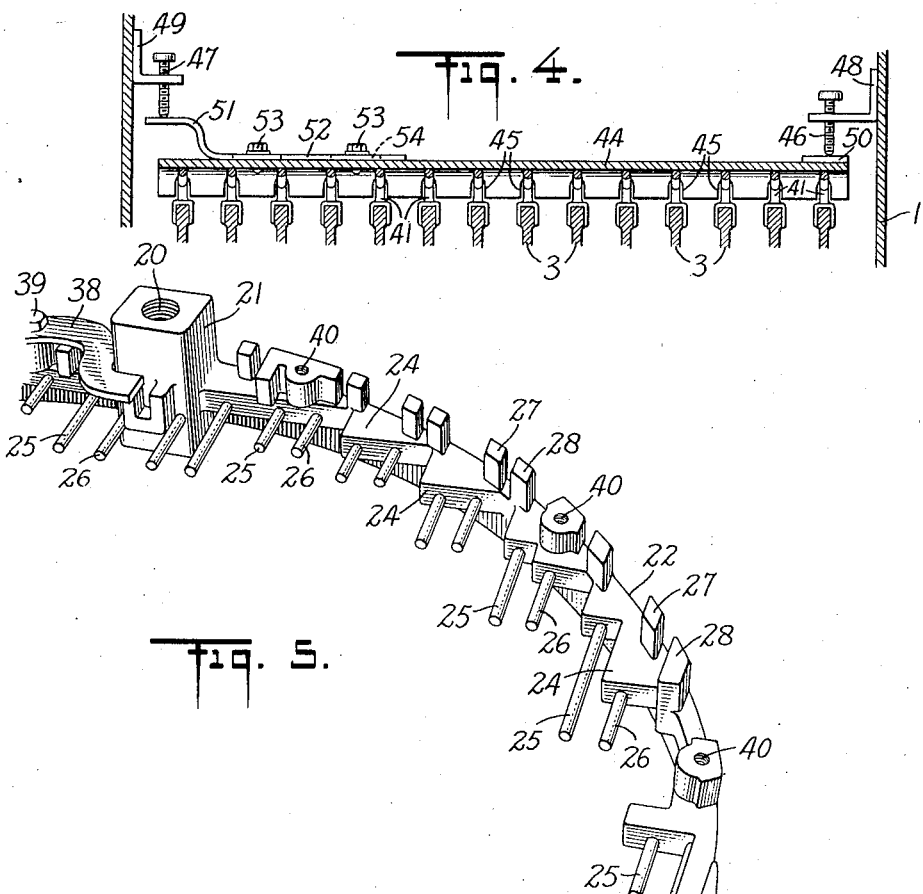
INVENTOR
Henry C. A. Meyer
BY
Blair, Curtis, Dunne & Hayward
ATTORNEYS Patented Dec. 12, 1939

2,183,368

UNITED STATES PATENT OFFICE 2,183,368

FILTER

Henry C. A. Meyer, Syracuse, N. Y., assignor to United States Hoffman Machinery Corporation, New York, N. Y., a corporation of Delaware Application February 3, 1937, Serial No. 123,744

4 Claims. (Cl. 210—182)

This invention relates to filters, and more particularly to a filter having incorporated therewith means for cleaning the filtering surfaces of the filter elements thereof.

In filters of the type comprising a casing containing hollow filter members which retain on their surfaces matter filtered out of the liquid flowing through the casing and filter members, the filter surfaces become clogged and covered with such matter to an extent necessitating frequent cleaning of the surfaces. Furthermore, the manner in which many such filters are constructed and the design and support of scrapers therefor render the installation of filter members and scraper elements a difficult and tedious operation, as is also the removal of these parts when such becomes necessary.

One of the objects of this invention is to provide a simple, efficacious, and easily operable means for cleaning the filtering surfaces of filters of the character described.

Another object is to provide cleaning means of the scraper type which may be easily installed in proper relation to the filter members within the filter casing and which will be self-supporting in all positions thereof.

A further object is to provide means associated with the cleaning means for facilitating the assembly of the filter elements themselves within the filter casing by giving said members lateral support and guidance during their introduction into the casing, and to provide other means for securely holding the filter elements in fixed position after they have been properly set within the casing.

A further object is to provide a filter plate scraper construction having scraper elements exerting substantially uniform pressure upon each portion of the filtering surface engaged thereby.

Other objects will be in part obvious and in part pointed out hereinafter.

The invention accordingly consists in the features of construction, combinations of elements, and arrangement of parts as will be exemplified in the structure to be hereinafter described and the scope of the application of which will be indicated in the following claims.

In the accompanying drawings in which is shown one of the various possible embodiments of the present invention—

Fig. 2 is a partial horizontal cross-section on a larger scale, taken substantially on line 2—2 of Fig. 1;

Fig. 3 is a fragmentary section on the same scale as Fig. 2, taken on line 3—3 of Fig. 1;

Fig. 4 is a detail cross-section taken on line 4—4 of Fig. 1; and

Fig. 5 is a perspective view showing the general form and details of construction of a portion of an arcuate member used to support the scraper elements in proper relation to the filtering surfaces of the filter.

Similar reference characters refer to similar parts throughout the different views of the drawings.

Figure 1:
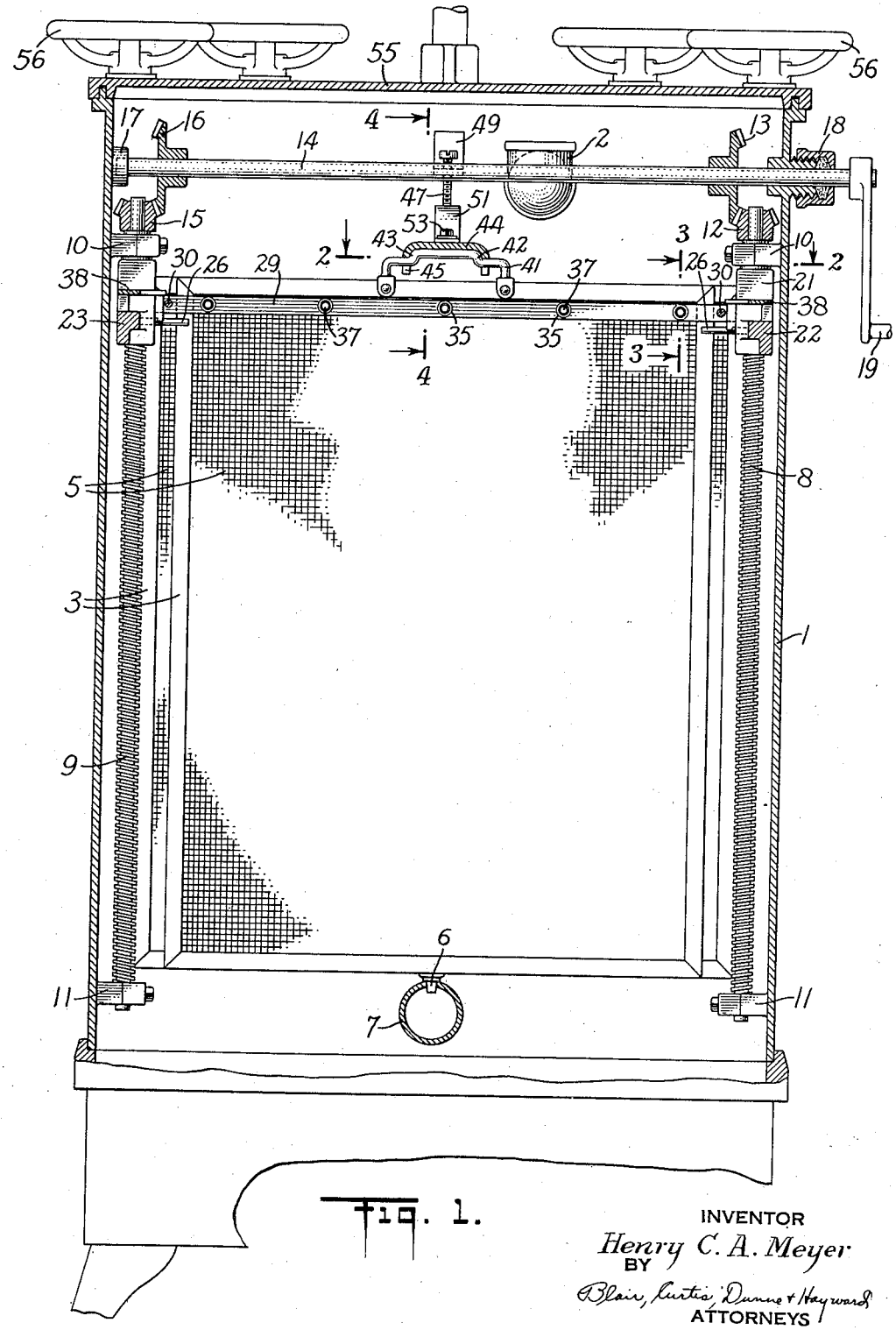
Fig. 1 is a vertical cross-section of a filter embodying one mode of carrying out the invention, taken substantially on line 1—1 of Fig. 2.

Referring to the drawings, there is shown a filter casing 1 into which the liquid to be filtered enters through an inlet 2 and which houses a plurality of hollow filter plates or leaves 3 each having screen filtering surfaces 4 and 5. The interiors of the filter leaves 3 communicate respectively through nipples 6 with an outlet manifold 7 leading the filtered liquid from the casing 1.

Mounted within the casing in substantial parallelism to one another are two vertical helically threaded shafts 8 and 9 disposed diametrically opposite each other in a plane parallel to the planes of the filter plates 3. These screw shafts are supported near their upper ends in bearings 10 and near their lower ends by bearings 11. The members of each pair of bearings 10 and 11 are disposed in substantial vertical alignment and extend inwardly from and are supported by the interior surface of the casing 1. Screw shaft 8 is provided at its upper end above the bearing 10 with a bevel pinion 12 meshing with a bevel gear 13 disposed upon a horizontally mounted shaft 14. At the upper end of the other screw shaft 9 is a bevel pinion 15 meshing with a bevel gear 16 also mounted fixedly upon the shaft 14.

Shaft 14 is supported at its inner end in a bearing 17 and extends through a bearing and stuffing box 18 at its other end to a point outside the casing, where it is provided with a hand crank 19 by means of which shaft 14 may be turned in either direction to cause simultaneous rotation of the screw shafts 8 and 9. It is to be noted that when the shaft 14 rotates in a direction to turn the shaft 8 clockwise the arrangement of the bevel pinions is such that the screw shaft 9 will be turned in a counter-clockwise direction, and vice versa when the shaft 14 is rotated in the other direction; and that screw shafts 8 and 9 are provided respectively with right and left-hand threads. The threads of the screw shaft 8 engage the threads 20 of a central boss 21 formed upon an arcuate member 22, and similarly the screw 9 engages the threads of a like arcuate member 23. These two arcuate members are disposed in the same horizontal plane when the apparatus is completely installed and adjusted for operation.

Referring to Figs. 2 and 5, it will be seen that each arcuate member is symmetrical with respect to its center lug 21 and that each half of such member comprises a series of inwardly extending steps 24 from which extend in pairs parallelly disposed pins 25 and 26. In the normal setting of the arcuate member within the casing, these pins will project along lines parallel to the filter elements 3 and will be so positioned that each pair will straddle loosely the lateral end portions of the filter elements, as will be clearly understood by reference to Fig. 2. It has been found that these pin members aid greatly in the removal or replacement of filter elements 3 since they serve as guides for the end portions of the filter element frames as the elements are withdrawn or placed within the filter casing, and make it much easier to insert the nipples 6 in their proper sockets in the outlet conduit 7; and, further, they aid in bringing the filter elements into parallelism one with another.

Each arcuate member 22, 23 is also provided with upstanding lugs arranged in pairs as indicated at 27 and 28. There are a plurality of these pairs, each pair being disposed in a position central with respect to the spaces between the filter elements 3 except the end lugs which are disposed beyond the outer filter elements.

By reference to Figs. 1 and 2 it will be seen that between each pair of filter elements and also beyond the last filter elements there is disposed a horizontal bar 29, each such bar being mounted at its respective ends in the spaces between a pair of lugs 27, 28. Each bar 29 carries adjacent its ends, but clear of the arcuate members, pins 30 which extend loosely through holes in the bar 29 and support upon opposite sides of the bar 29 the corresponding ends of opposed scraper elements 31 and 32. Each of these elements is in the form of a straight strip throughout the greater part of its length and is disposed to lie against a screen or filtering surface of one of the filter members 3; but at its ends is offset toward its respective bar 29, and it is through the offset portions thereof that the pins 30 pass. Cotter pins or other retaining devices may be inserted as at 33 to retain the scraper elements upon the pins. As disclosed in Fig. 2, one end of each pin is provided with a head 34 for holding one of the scraper elements in place. Thus it will be seen that a bar 29 lies between each pair of scraper elements and that each bar supports a pair of scrapers, one of which contacts the adjacent surface of one filter member while the other contacts the opposing adjacent surface of an adjacent filter member. The scraper elements 31, 32 are preferably beveled at their edges, as indicated at 31a, to provide chisel-like edges 31b, which facilitate the removal of deposit from the filter surfaces.

The scraper members 31, 32 are made of more or less flexible material and are pressed against the surfaces of the filter members by means of a plurality of pairs of springs 35, 36, the members of each pair of springs being located opposite one another between the bar 29 and a scraper element and are held in position by means of a through pin 37 fixed in relation to the bar. Any desired number of these pairs of springs may be distributed between the bar and its associated scraper elements so that the pressure of the scraper elements is evenly distributed upon all that portion of a filter member contacted thereby. Such an arrangement not only provides for more efficient removal of the matter deposited upon the filtering surfaces but, in addition, the flexibility of the scraper elements permits them to recede slightly from the filtering surfaces and ride over any inequalities in said surfaces.

The bars and their associated scrapers are thus supported at their ends by the two arcuate members 22, 23 and will rise with those arcuate members when the latter are lifted by means of their respective screw shafts. In order that the bars and scrapers may not be left behind as the arcuate members are lowered, curved plates 38 are provided to overlie the ends of the bars and rest upon the tops of the lugs 27, 28. These plates are secured to the arcuate members by means of studs 39 which pass through holes in the plates and engage threaded holes 40 in the arcuate members. It will be noted that the bars 29 do not fit tightly between the lugs 27, 28 nor are they held rigidly in position by the plates 38. Thus each scraper assembly is shiftable to a certain extent relatively to the respective arcuate members whereby proper adjustment of the scraper elements relatively to the filtering surfaces may be had irrespective of the exact position occupied by the filter members, particularly in regard to parallelism; and it is to be noted also that there is clearance provided between the sides of the pins 30 and the lugs 27, 28 on the arcuate members so that endwise adjustment of the scraper assemblies may take place.

During assembly the arcuate members may first be properly disposed upon their screws and the filter members dropped into position with their nipples engaging the sockets in the conduit 7, the guide pins 25, 26 being employed to establish correct positioning of the filter members, after which it is a simple matter to drop the bars 29 with their assembled scrapers into position between adjacent filter members. When the plates 38 have been applied the construction is complete.

However, once the filter members have been engaged with the conduit 7, they may be more accurately brought into parallelism and held immovably in position by means of a fastening device more clearly shown in Figs. 1, 2 and 4. Each filter member is provided with a handle 41 provided with offset shoulders 42, 43. The said fastening device comprises a channel-shaped member 44 having slots 45 in the down-turned flanges thereof which may be brought into engaging relation with the handles 41 upon either side of said shoulders, a pair of opposed slots being provided for each handle. After the channel 44 has been placed upon the handles it may be fastened down by means of adjustment screws 46 and 47 which are threaded into brackets 48 and 49 disposed upon the interior wall of the casing. The end of screw 46 engages a plate 50 at one end of the channel 44 and the other screw engages an offset portion 51 of a plate 52 which is adjustably mounted upon the channel by means of studs 53 threaded into the channel and passing through slots 54 in the plate 52. Thus the channel 44 may be given endwise movement or twisted in either direction to bring the slots into coincidence with the handles of the respective filter members, and by proper shifting of the channel 44 the filter members may be brought into very exact parallelism and held rigidly in such position. The filter casing is furnished with the usual cover 55 which may be clamped down to make a tight closure by any usual form of locking means 56.

The operation of the filter with its assembled scraper arrangement is as follows: Supposing the scraper mechanism to occupy its uppermost position as shown in Fig. 1, when it is desired to clean the filter members, the crank 19 is turned in a direction to give a simultaneous rotation to the screws 8 and 9 causing downward movement of the opposed arcuate members, and this downward movement results in carrying the whole system of scrapers downwardly, the individual scrapers traveling in contact with their respective filtering surfaces. When the central bosses 21 of the supporting members engage the lower bearing members 11 the scrapers will have traversed the entire surface of the filter members. By turning the crank 19 in the opposite direction the scrapers may be raised in the same manner in contact with the filtering surfaces until the bosses of the arcuate members come in contact with the upper bearing members 10.

From the foregoing it will be seen that this invention is well adapted to attain all of the ends and objects hereinbefore set forth in a practical manner; that the construction is simple and rugged and free from parts likely to get out of order or adjustment; and that the scraper assembly is such that it is self-supporting in all positions of the scrapers, whereby facility in installation and removal is attained. It should also be noted that the relationship of the various parts of the scraping system is such that the correct functioning of any one element is not dependent upon a definitely maintained position of any other element.

As many possible embodiments may be made of the above invention without departing from the scope thereof, it is to be understood that all matter herein set forth or shown in the accompanying drawings is to be interpreted as illustrative and not in a limiting sense.

I claim:

1. In a filter having a casing, a plurality of filter members positioned uprightly within the casing in mutual spaced relation, a plurality of scraper units comprising elements disposed between and in contact with the opposed surfaces of adjacent filter members, a plurality of independent travelers within the casing providing supporting means for said scraper units adjacent the lateral edges of said filter members at opposite sides of the casing, and means on said travelers adapted to serve as guides for correctly positioning said filter members within the casing.

2. In a filter having a casing, a plurality of filter members positioned uprightly within the casing in mutual spaced relation, a plurality of scraper units comprising elements disposed between and in contact with the opposed surfaces of adjacent filter members, a plurality of independent travelers within the casing providing supporting means for said scraper units adjacent the lateral edges of said filter members at opposite sides of the casing, means on said travelers adapted to serve as guides for correctly positioning said filter members within the casing, and means for causing synchronous movement of said travelers.

3. In a filter having a casing, a plurality of filter members positioned uprightly within the casing in mutual spaced relation, a plurality of scraper units comprising elements disposed between and in contact with the opposed surfaces of adjacent filter members, a plurality of independent travelers within the casing providing supporting means for said scraper units adjacent the lateral edges of said filter members at opposite sides of the casing, and means on said travelers comprising projecting members extending beyond the lateral edges of said filter members upon either side thereof adapted to serve as guides for correctly positioning said filter members within the casing.

4. In a filter having a casing, a plurality of filter members positioned uprightly within the casing in mutual spaced relation, a plurality of scraper units comprising loosely mounted elements disposed between and resiliently urged into contact with the opposed surfaces of adjacent filter members, a plurality of independent travelers within the casing providing supporting means for said scraper units, a plurality of vertical feed screws rotatably mounted within the casing and engaging threaded portions of the respective travelers and about which said travelers may swing independently to assume operative positions relatively to said filter members, and means for simultaneously rotating said feed screws to effect movement of said travelers and scraper elements relatively to said filter members.

HENRY C. A. MEYER.